INVENTORS.
Francis E. Heffner &
Roy H. Brandes

Robert J. Outland
ATTORNEY

United States Patent Office 3,458,995
Patented Aug. 5, 1969

3,458,995
HOT GAS ENGINE CONTROL SYSTEM
Francis E. Heffner, Troy, and Roy H. Brandes, Utica, Mich., assignors to General Motors Corporation, Detroit, Mich., a corporation of Delaware
Filed Dec. 21, 1967, Ser. No. 692,494
Int. Cl. F02g 1/04, 1/06
U.S. Cl. 60—24                                     13 Claims

ABSTRACT OF THE DISCLOSURE

A control system for a closed cycle hot gas engine particularly adapted for vehicle installation and including a manually adjustable system for variably controlling the pressure of the engine working gas to provide for changes in engine torque between idle and full output. The system further includes a combustion system actuated through conventional ignition and start switches and an automatic starting system for starting the engine when the proper working gas temperature has been reached.

BACKGROUND OF THE INVENTION

This invention relates to hot gas engines and more particularly to a control system for a closed cycle hot gas engine such as a Stirling cycle engine and including manual control means especially adapted for use in a vehicle.

It is known in the art to provide means for controlling hot gas engines of the Stirling cycle type by varying the pressure of the working gas in the engine working space. Such pressure variation has been accomplished by supplying gas from external storage means to the working space and exhausting gas from the working space to the storage means through the operation of suitable transfer and control means. In some engine applications the control means are arranged to be responsive to the speed of the engine so that engine speed is controlled as desired by varying the working gas pressure. An example of a control system of this type is that shown in U.S. patent application Ser. No. 522,553, Brandes, now Patent No. 3,355,- 881, granted Dec. 5, 1967, assigned to the assignee of the present invention:

While such prior art systems are adequate for numerous engine applications, it is desirable, when applying a hot gas engine to a vehicle such as an automobile or bus, to provide for direct operator control of the engine torque so that engine operation, or "feel," will be similar to that encountered by drivers with vehicles conventionally powered by internal combustion engines. In addition, a suitable control system for starting the engine, utilizing driver actuated devices similar to those used in internal combustion engine driven vehicles, is also desirable to reduce operating difficulty.

SUMMARY

The present invention provides a control system particularly adapted for a Stirling cycle hot gas engine installed in a vehicle.

The system includes means for starting the engine which are operable through an ignition switch and starter switch similar to those used on internal combustion engine powered vehicles. For efficiency, the engine heater is maintained at a constant temperature through automatic control of a combustion system.

Engine power is varied in a known manner by varying the gas pressure in the engine working space; however, pressure responsive regulating means are utilized to maintain the desired working space pressure by sensing the mean pressure in the working space and controlling the gas supply and exhaust in accordance with desired pressure requirements. The regulating means includes manually adjustable pressure selection means which are actuated by the vehicle operator such as through a conventional foot pedal to manually select the desired working gas pressure. The variation of this manual selection means thus varies the engine output torque and provides engine operation similar to that of a throttle controlled internal combustion engine.

The invention includes specific mechanisms for providing the desired control functions as well as other features, reference to which will subsequently be made.

DESCRIPTION OF THE PREFERRED EMBODIMENT

Figure 1:
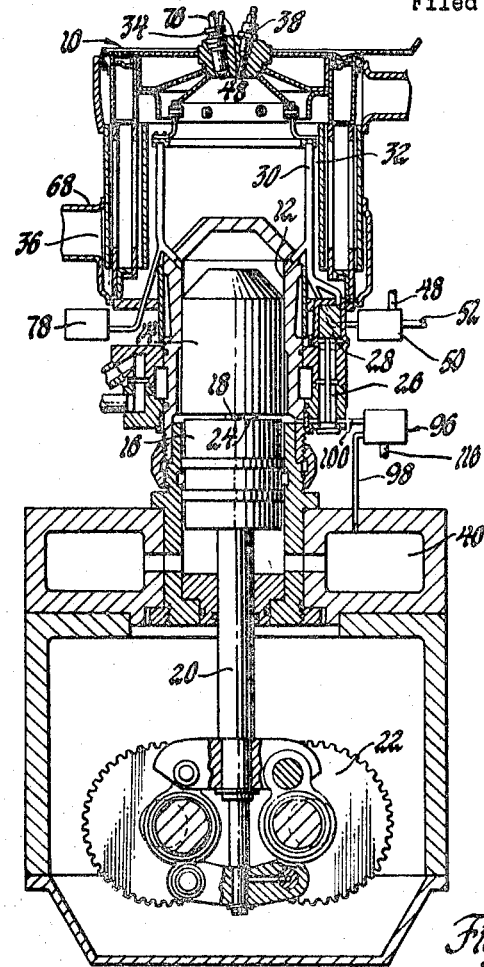
FIGURE 1 is a cross-sectional view of a hot gas engine of the Stirling cycle type including portions of a control system according to the invention.

Referring now more specifically to the drawings, FIGURE 1 discloses a hot gas engine generally indicated by numeral 10 and of the type disclosed in U.S. patent application Ser. No. 575,102, Dorer, now Patent No. 3,364,675, granted Jan. 23, 1968, the disclosure of which is incorporated herein by reference. The engine includes a cylinder 12 in which are coaxially disposed a displacer piston 14 and a power piston 16. Pistons 14 and 16 are respectively secured to coaxial connecting rods 18 and 20 which connect with suitable crank mechanism 22.

Above the power piston 16 is a working space 24 which extends between the power and displacer pistons 16, 14, and by means of suitable passages, through cooler 26, regenerator 28 and heat exchanger 30 to the portion of cylinder 12 above the displacer piston 14. Heat exchanger 30 is surrounded by a heater 32 which carries fuel supply means such as nozzle 34, air supply means such as opening 36 and ignition means such as spark plug 38 by which combustible mixture is formed and burned in the heater to heat the working gas in the heat exchanger 30. Cooler 26 may be of any suitable type and is preferably supplied with liquid coolant from external cooling means (not shown).

Below the power piston 16, a buffer space 40 is provided in which pressurized gas is maintained to, in part, balance the working gas pressure on the power piston so as to reduce the gas forces acting on the crank mechanism 22. The above construction is known and represents a conventional way of constructing a Stirling cycle engine.

Figure 2:
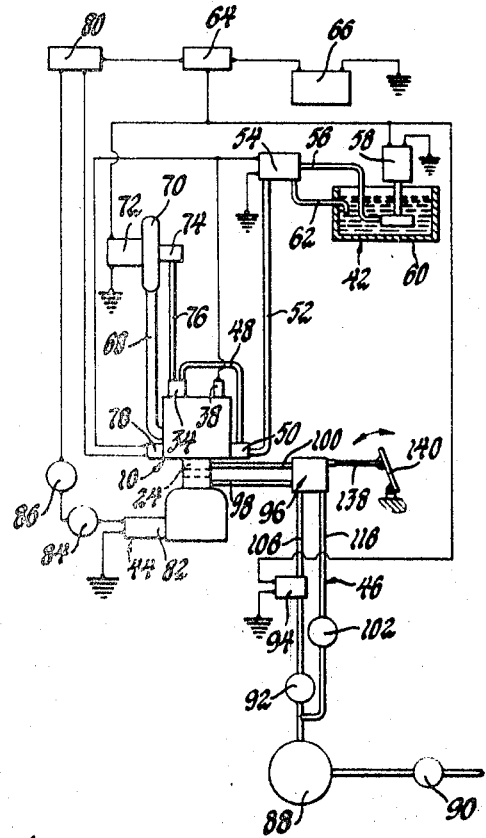
FIGURE 2 is a diagrammatic view showing the elements of a preferred embodiment of the present control system and their interrelationship as connected with the engine of FIGURE 1

The present invention relates to a control system for an engine which may be of the type above described and which is suitable for controlling such an engine as installed in a vehicle. The preferred embodiment of the system is shown in FIGURE 2 as connected with the engine 10 to include various interconnected major subsystems. These we will for simplicity call the combustion system, the starting system and the gas pressure control system which are generally indicated by the numerals 42, 44, 46; respectively.

COMBUSTION SYSTEM

The combustion system includes conventional fuel and air supply means as well as means for igniting the combustible mixture in the heater 32. The fuel supply means includes fuel nozzle 34 which is connected through a supply line 48 with a heater temperature operated fuel control valve 50. Valve 50 connects through line 52 with a three-way solenoid valve 54. Valve 54 receives fuel through line 56 from the output of a motor driven fuel pump 58 which is supplied by fuel in tank 60. A return line 62 also connects valve 54 with the fuel tank. Fuel pump 58 is electrically connected through ignition switch 64 with a battery 66 to provide power.

The air supply means includes a pipe 68 which connects between opening 36 of the engine heater and an air supply blower 70 driven by motor 72. A small air pump 74 is also driven by motor 72 and supplies air through conduit 76 to the fuel nozzle 34. Motor 72 is also electrically connected through ignition switch 64 to the battery 66 from which it receives power.

The ignition means include spark plug 38 which is electrically connected through a heater mounted over-temperature control switch 78, a start switch and holding circuit 80 and ignition switch 64 to the battery 66. The fuel solenoid valve 54 is connected to the battery through the ignition, start and over-temperature switches in the same manner as the spark plug so that fuel can only be supplied to the heater when the spark plug is in operation.

In order to operate the engine combustion system, the ignition switch 64 must be closed and start switch 80 must be actuated so that the holding circuit is energized. Closing of the ignition switch 64 starts the fuel pump 58 and the blower motor 72 which supplies combustion air to the burner through pipe 68 and to the nozzle through conduit 76. Energizing of the holding circuit 80 supplies power to the spark plug 38 as well as energizing solenoid valve 54, permitting fuel to flow from the fuel pump to the burner nozzle and initiate combustion in the heater jacket 32. When the burner reaches the desired operating temperature, fuel control valve 50 modulates the flow of fuel to the nozzle to hold a relatively constant temperature in the burner. If for any reason the burner temperature exceeds a desired maximum, over-temperature control switch 78 opens, cutting off power to solenoid valve 54 and spark plug 38 stopping combustion. This also opens holding circuit 80 which must then be reset for further operation of the burner.

STARTING SYSTEM

In order to start the engine, a starting system is provided which includes an electric cranking motor 82, an engine speed drop-out switch 84 and an engine gas temperature switch 86. These items are connected in series with start switch and holding circuit 80 and operate in the following manner.

When the start switch is closed, energizing the holding circuit 80, power is supplied from the battery 66, through the ignition switch 64 and holding circuit 80 to the gas temperature switch 86. This switch 86 is connected to sense the temperature of the working gas in the heat exchanger 30 and remains open until the gas temperature has increased, due to burner operation, to a predetermined temperature level adequate for engine operation. At this point, gas temperature switch 86 closes supplying power through engine speed drop-out switch 84 to the cranking motor 82 and permitting the cranking motor to start the engine. When the engine reaches a predetermined speed, this is sensed by drop-out switch 84 which opens, cutting off power to the cranking motor and cutting off further action of the starting system. The engine then operates as previously described.

GAS PRESSURE CONTROL SYSTEM

In order to operate the engine at varying output torques and speeds ranging from idle to full rated load, it is desirable that some means be provided to vary the pressure of the working gas in the working space. In the preferred embodiment, this is accomplished by means of a gas pressure control system which includes a main storage tank 88 in which a supply of working gas, preferably hydrogen, is kept under pressure. A relief valve 90 is provided to relieve excessive pressure in the tank. The storage tank 88 is connected through a pressure reducing valve 92 and solenoid cut-off valve 94 to a pressure governor or regulator generally indicated by numeral 96 and shown in detail in FIGURE 3.

Governor 96 controls the supply of gas to the working and buffer spaces of the engine through conduit 98, which may be connected in any suitable manner. In the present instance, conduit 98 is connected directly to the engine buffer space 40 and through this to working space 24. This is so, since the engine is arranged internally to interconnect the buffer and working spaces at predetermined portions of the engine cycle so that when gas pressure is increased in the buffer space, a portion of the gas is transmitted to the working space increasing the pressure there also. The way in which this is accomplished is shown in the aforementioned U.S. patent application Ser. No. 575,102, Dorer. It should be noted that, if desired, the supply conduit 98 could be connected directly with both the buffer and working spaces of the engine using check valves or other means to prevent undesired bypassing between these spaces. Such an arrangement is shown in the previously mentioned U.S. patent application Ser. No. 522,553, Brandes.

Pressure governor 96 is also connected directly to the engine working space through conduit 100 and controls the exhaust of gas from the working and buffer spaces through this conduit. Exhausted gas is transmitted to a gas compressor 102 which increases the pressure and returns the compressed gas to storage tank 88. Solenoid cut-off valve 94 is connected to ignition switch 64 so as to be open to permit the passage of gas whenever the ignition switch is closed.

Figure 3:
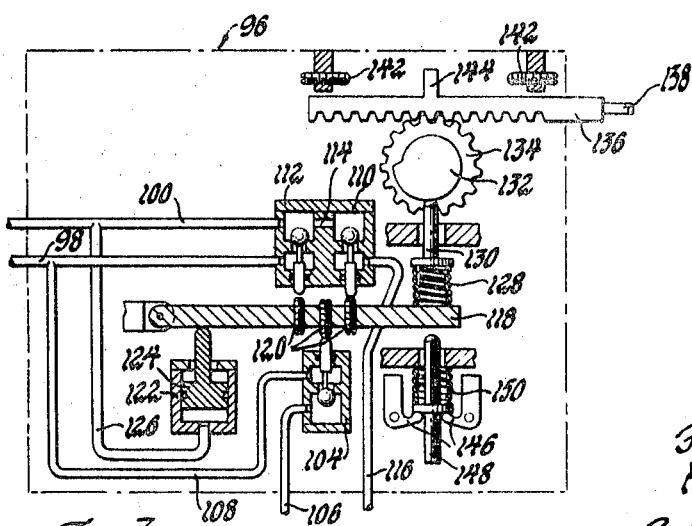
FIGURE 3 is an enlarged view showing a pressure regulator unit for use in the control system of FIGURE 2.

Pressure governor 96 might be made in any suitable form; however, a preferred arrangement for such a governor is schematically shown in FIGURE 3 of the drawings. As shown, the governor comprises a fill valve 104 connecting through line 106 with solenoid valve 94 and through lines 108 and 98 with the engine buffer space. Oppositely disposed from the fill valve are a dump valve 110 and bypass valve 112 located in a common housing. Bypass valve 112 connects through lines 98 and 100 with the engine buffer and working spaces respectively. Dump valve 110 connects through passage 114 and line 100 with the engine working space and through line 116 with gas compressor 102.

A pivotally mounted actuating lever 118 is arranged between the valves so as to open the fill valve upon a downward movement and open the dump valve and bypass valve upon an upward movement. Adjusting means such as screws 120 are provided to properly adjust the valve positions. The adjustments are preferably such that all valves are closed with the lever in intermediate position and the dump valve 110 opens first upon a slight upward movement with the bypass valve 112 opening only if a greater upward movement of the lever 118 occurs. If desired, however, the dump valve 110 and bypass valve 112 may be arranged to open at the same time.

The governor further includes a cylinder 122 carrying a reciprocable piston 124, one end of which engages the under side of lever 118. The lower face of piston 124 is acted upon by gas pressure supplied through a capillary line 126 connecting the cylinder 122 with the engine working space. The capillary line acts to restrict gas flow so that cyclic pressure variations in the engine working space are not transmitted to cylinder 122 but changes in the mean working pressure due to operation of the gas pressure control system are followed by the pressure in the cylinder 122.

The upper surface of lever 118 is engaged by a spring 128 which is partially compressed by a follower 130 controlled by a rotatably mounted cam 132. Cam 132 is in turn actuated by a gear 134 engaged by a rack 136 which is mechanically connected through linkage 138 with a manual foot pedal 140. Adjustable stop means 142 are provided to be engaged by an abutment 144 on the rack to limit travel of the manual actuating means.

Beneath lever 118 an over-speed governor mechanism is provided comprising rotating flyweights 146 which engage a reciprocable shaft 148 urging the shaft upwardly against a spring 150 to engage the lower surface of lever 118. Flyweights 146 are rotated at a speed proportional to engine speed through mechanism not shown.

In operation, closing of the ignition switch energizes cut-off solenoid 94 permitting pressurized gas from tank 88 to be supplied at reduced pressure through pressure reduction valve 92 and cut-off valve 94 to fill valve 104. When the engine is in operation, an increase in engine torque is obtained by moving pedal 140 in a counterclockwise direction. This moves rack 136 leftwardly rotating cam 132 so as to increase the downward force of follower 130 on spring 128. Assuming the mean working pressure acting on piston 124 is less than that called for, lever 118 is pivoted downward by the bias of the spring, opening valve 104 and permitting pressurized gas to flow through lines 108 and 98 to the engine buffer space 40. This increases the buffer space pressure and, through the action of the previously referred to internal connection between the buffer and working spaces, a portion of the gas is transmitted to the working space 24, increasing the pressure therein. The increase in mean working pressure is transmitted through lines 100 and 126 to cylinder 122 acting against piston 124 and urging lever 118 upwardly until, when the desired pressure is reached, lever 118 resumes a neutral position closing valve 104 and shutting off the flow of gas.

If a decrease in engine torque is desired, pedal 140 is moved clockwise reducing the downward bias of spring 128 and permitting piston 124 to move lever 118 upwardly opening dump valve 110. This permits the exhaust of gas from the working space through lines 100 and 116 to the gas compressor which pumps this gas back into storage tank 88. If the capacity of gas compressor 102 is not sufficient to promptly reduce the working pressure in the degree called for by the movement of the foot pedal, lever 118 will be urged further upwardly opening bypass valve 112 and connecting the working and buffer spaces through lines 100 and 98. This bypassing permits working gas to continuously bypass the power piston and immediately reduce engine power in the degree permitted by the opening of the bypass valve. This condition continues until the gas compressor 102 has sufficiently reduced the working pressure by pumping working gas back to the storage tank 88, at which time, first the bypass valve and then the dump valve are closed by the return of the lever 118 to the neutral position.

In case of an engine overspeed, flyweights 146 urge shaft 148 into engagement with lever 118 moving it upwardly and acting to exhaust working gas from the engine and, if necessary, bypass gas around the power piston until the overspeed condition is corrected.

While the invention has been described by reference to a preferred embodiment, it should be apparent that numerous changes could be made within the spirit and scope of the invention as disclosed herein. As one example, the control system could be applied to a double acting engine in which there is no buffer space by arranging the bypass valve or valves to connect the two working chambers on opposite sides of each power piston. Accordingly, the invention is not intended to be limited except by the language of the following claims.

We claim:

1. A control system for a hot gas engine of the type having a cylinder, a power piston in said cylinder and, in part, defining therewith an enclosed working space on one side of said piston and a second enclosed space on the other side of said piston, gas storage means, gas transfer means connecting the gas storage means with said working space for transferring gas therebetween and heating means for supplying thermal energy to the gas in the working space, said control system comprising
regulating means in said gas transfer means and including
a fill valve operable to interconnect the storage means with the working space to control gas flow thereto,
a dump valve operable to interconnect the storage means with the working space to control gas flow therefrom,
a bypass valve operable to interconnect the working space with the second space to permit the bypassing of gas around the power piston and the reduction of engine output torque thereby and
actuating means responsive to pressure in the working space and operable to open the fill valve when working pressure is below a desired range, to open the dump valve when working pressure is above the desired range, to open the bypass valve when working pressure exceeds the desired range by a predetermined amount and to close all said valves when the working pressure is within the desired range,
whereby engine torque is controlled by operation of the regulating means to adjust the working pressure toward the desired range whenever the limits of said range are exceeded and to bypass gas around the power piston whenever the working pressure exceeds the desired range by a predetermined amount.

2. The control system of claim 1 wherein said regulating means includes adjustable pressure selection means acting on said actuating means to adjust the desired range of gas pressure to be maintained in said working space.

3. The control system of claim 2 wherein said predetermined amount is selected such that the bypass valve will remain closed whenever only small reductions in the working gas pressure are called for and said bypass valve will be opened only when manual adjustment of the pressure selection means calls for a substantial reduction in engine working pressure so as to substantially reduce engine torque.

4. The control system of claim 2 wherein said actuating means includes adjusting means to vary the point of opening of the bypass valve with respect to the dump valve whereby said predetermined amount of pressure difference is adjustable within a range including zero.

5. The control system of claim 4 wherein said regulating means includes overspeed control means responsive to an engine overspeed condition to move said actuating means so as to open said dump valve.

6. The control system of claim 2 and further comprising
temperature control means operable to hold said heating means at a predetermined operating temperature and
manual actuating means connecting with said adjustable pressure selection means and operable to adjust the setting of said pressure selection means to vary the engine working pressure and control engine torque.

7. The control system of claim 6 wherein said heating means include
a gas heat exchanger,
a fuel fired burner,
air supply means and
fuel supply means
and said temperature control means include a flow modulating control valve responsive to the temperature of said burner to modulate the supply of fuel delivered by said fuel supply means so as to maintain said burner temperature substantially constant.

8. The control system of claim 6 and further including engine starting means actuated manually to operate said heating means and operative in response to a predetermined temperature of said heating means to start the engine.

9. The control system of claim 8 wherein said engine starting means include a starter motor,
an engine speed switch,
a temperature switch and
a manual start switch,
said manual start switch being connected to said heating means to initiate operation of said heating means upon actuation of said starting switch,
said temperature switch being responsive to the temperature of said heating means to energize said starting motor and crank the engine when a predetermined heater temperature is reached and
said engine speed switch being responsive to the speed of the engine to de-energize the starting motor and discontinue its cranking when a predetermined engine speed has been reached.

10. A control system for a hot gas engine of the type having a cylinder, a power piston in said cylinder and, in part, defining therewith an enclosed working space on one side of said piston and a buffer space on the other side of said piston, gas storage means, gas transfer means connecting the gas storage means with the working and buffer spaces for transferring gas therebetween and heating means for supplying thermal energy to the gas in the working space, said control system comprising > regulating means in said gas transfer means and including
> a fill valve operable to interconnect the storage means with the working and buffer spaces to control gas flow thereto,
> a dump valve operable to interconnect the storage means with the working and buffer spaces to control the exhaust of gas therefrom,
> a bypass valve operable to interconnect the working space with the buffer space to permit the bypass of gas around the power piston and the reduction of engine output torque thereby and
> actuating means responsive to pressures in the working space and operable to open the fill valve when working pressure is below a desired range, to open the dump valve when working pressure is above the desired range, to open the bypass valve when working pressure exceeds the desired range by a predetermined amount and to close all said valves when working pressure is within the desired range,
> whereby engine torque is controlled by operation of the regulating means to adjust the working pressure toward the desired range whenever the limits of said range are exceeded and to bypass gas around the power piston whenever the working pressure exceeds the desired range by a predetermined amount.

11. The control system of claim 9 wherein said regulating means includes adjustable pressure selection means acting on said actuating means to adjust the desired working pressure maintained in the working space.

12. The control system of claim 10 and further comprising temperature control means operable to hold said heating means at a predetermined operating temperature and manual actuating means connecting with said adjustable pressure selection means and operable to adjust the setting of said pressure selection means to vary the engine working pressure and control engine torque.

13. The control system of claim 12 and further comprising engine starting means actuated manually to operate said heating means and operative in response to a predetermined temperature of said heating means to start the engine.

References Cited

UNITED STATES PATENTS

| | | | |
|---|---|---|---|
| 3,355,881 | 12/1967 | Brandes | 60—24 |
| 3,364,675 | 1/1968 | Dorer | 60—24 |
| 3,397,533 | 8/1968 | Steiner et al. | 60—24 |

EDGAR W. GEOGHEGAN, Primary Examiner

U.S. Cl. X.R.

62—6